US009801056B1

(12) United States Patent
Parsel et al.

(10) Patent No.: US 9,801,056 B1
(45) Date of Patent: Oct. 24, 2017

(54) WIRELESS COMMUNICATION SYSTEM TO SECURE DATA COMMUNICATIONS BETWEEN APPLICATION PROGRAMMING INTERFACES

(71) Applicant: Sprint Communications Company L.P., Overland Park, KS (US)

(72) Inventors: William M. Parsel, Overland Park, KS (US); Carl Joseph Persson, Olathe, KS (US); Lyle Walter Paczkowski, Mission Hills, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/507,323

(22) Filed: Oct. 6, 2014

(51) Int. Cl.
*G06F 7/04* (2006.01)
*H04W 12/06* (2009.01)

(52) U.S. Cl.
CPC .................... *H04W 12/06* (2013.01)

(58) Field of Classification Search
CPC .... G06F 3/04883; G06F 21/34; H04W 12/04; H04W 4/008; H04W 84/18; H04W 12/06; H04W 4/003; H04W 4/206; H04W 12/12; H04W 4/06; H04W 4/12; H04W 4/18; G07F 17/0014; G07F 17/26; H04L 2209/80; H04L 41/20; H04L 67/142; H04L 9/3234; H04L 9/3271
USPC .............................................................. 726/7
See application file for complete search history.

(56) References Cited

U.S. PATENT DOCUMENTS

| 2009/0125918 A1* | 5/2009 | Kansal | ..................... H04L 67/16 719/328 |
| 2010/0263043 A1* | 10/2010 | Xu | ........................ G06F 11/26 726/17 |
| 2010/0315225 A1* | 12/2010 | Teague | ................. A61B 5/0024 340/539.12 |

(Continued)

FOREIGN PATENT DOCUMENTS

CN          103514414          1/2014

OTHER PUBLICATIONS

Amit Vasudevan, et al.; "Trustworthy Execution on Mobile Devices: What security properties can my mobile platform give me?;" Nov. 16, 2011; 19 pages; CyLab/Carnegie Mellon University; Pittsburgh, PA.

(Continued)

*Primary Examiner* — Kambiz Zand
*Assistant Examiner* — Abiy Getachew

(57) ABSTRACT

A wireless communication system to secure data communications between APIs. The wireless communication system includes a first API for a first sensor in a first wireless communication device and a second API for a second sensor in a second wireless communication device. In the first wireless communication device, identifying an API request to externally share sensor data, and in response, performing a security challenge to verify the first API. If the first API is verified, then the API request is transferred to the second wireless communication device. In the second wireless communication device, performing a security challenge to verify the second API. If the second API is verified, then the API share request is transferred to the second API in the second wireless communication device.

20 Claims, 6 Drawing Sheets

(56) References Cited

U.S. PATENT DOCUMENTS

2012/0047214 A1* 2/2012 Daly .................. G06F 9/546
                                                   709/206
2013/0061242 A1   3/2013 Lewis

OTHER PUBLICATIONS

U.S. Appl. No. 14/033,633, filed Sep. 23, 2013.
U.S. Appl. No. 14/037,637, filed Sep. 26, 2013.
U.S. Appl. No. 14/036,454, filed Sep. 25, 2013.

* cited by examiner

WIRELESS COMMUNICATION SYSTEM TO SECURE DATA COMMUNICATIONS BETWEEN APPLICATION PROGRAMMING INTERFACES

TECHNICAL BACKGROUND

Wireless communication devices communicate over cellular communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. In some wireless communication systems, more than one wireless communication network may be employed across a geographic region. For example, a first wireless communication network employing a first wireless communication protocol may be deployed along with a second wireless communication network employing a second wireless communication protocol. Separate wireless access equipment may be deployed for each wireless communication network, such as when a fourth generation (4G) Long Term Evolution (LTE) wireless communication network is deployed over a similar geographic area as a third generation (3G) wireless communication network or other wireless communication networks.

Users operate wireless communication devices to communicate with other devices and access the Internet over communication networks. The wireless communication devices execute software applications, such as location applications, weather applications, social applications, camera applications, and other applications. Application Programming Interfaces (APIs), such as location APIs, camera APIs, speaker APIs, microphone APIs, screen APIs, interface with the software applications. The APIs define functionality, including application operations, inputs, outputs, and the like. Each API, such as a location API, may have multiple implementations and may be specific to a wireless protocol.

Establishing secure and trusted communication links between end user devices, such as between wireless communication devices over different wireless communication networks, can be difficult to achieve. Moreover, some end user devices might not have similar security hardware or software that other end user devices have, further complicating ensuring secure communications.

OVERVIEW

Examples disclosed herein provide system, methods, hardware, and software to secure data communications between Application Programming Interfaces (APIs). The method includes a first API for a first sensor in a first wireless communication device and a second API for a second sensor in a second wireless communication device. In one instance, the method for securing data communications between APIs includes, in the first wireless communication device, identifying an API request to externally share sensor data. The method further provides, in the first wireless communication device, performing a security challenge to verify the first API, and if the first API is verified, transferring the API request for delivery to the second wireless communication device. The method further includes, in the second wireless communication device, performing a security challenge to verify the second API, and if the second API is verified, transferring the API request for delivery to the second API.

In another example, a wireless communication system to secure data communications between APIs. The wireless communication system includes a first API for a first sensor in a first wireless communication device and a second API for a second sensor in a second wireless communication device. In the first wireless communication device, identifying an API request to externally share sensor data, and in response, performing a security challenge to verify the first API. If the first API is verified, then the API request is transferred for delivery to the second wireless communication device. In the second wireless communication device, performing a security challenge to verify the second API. If the second API is verified, then the API share request is transferred to the second API on the second wireless communication device.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
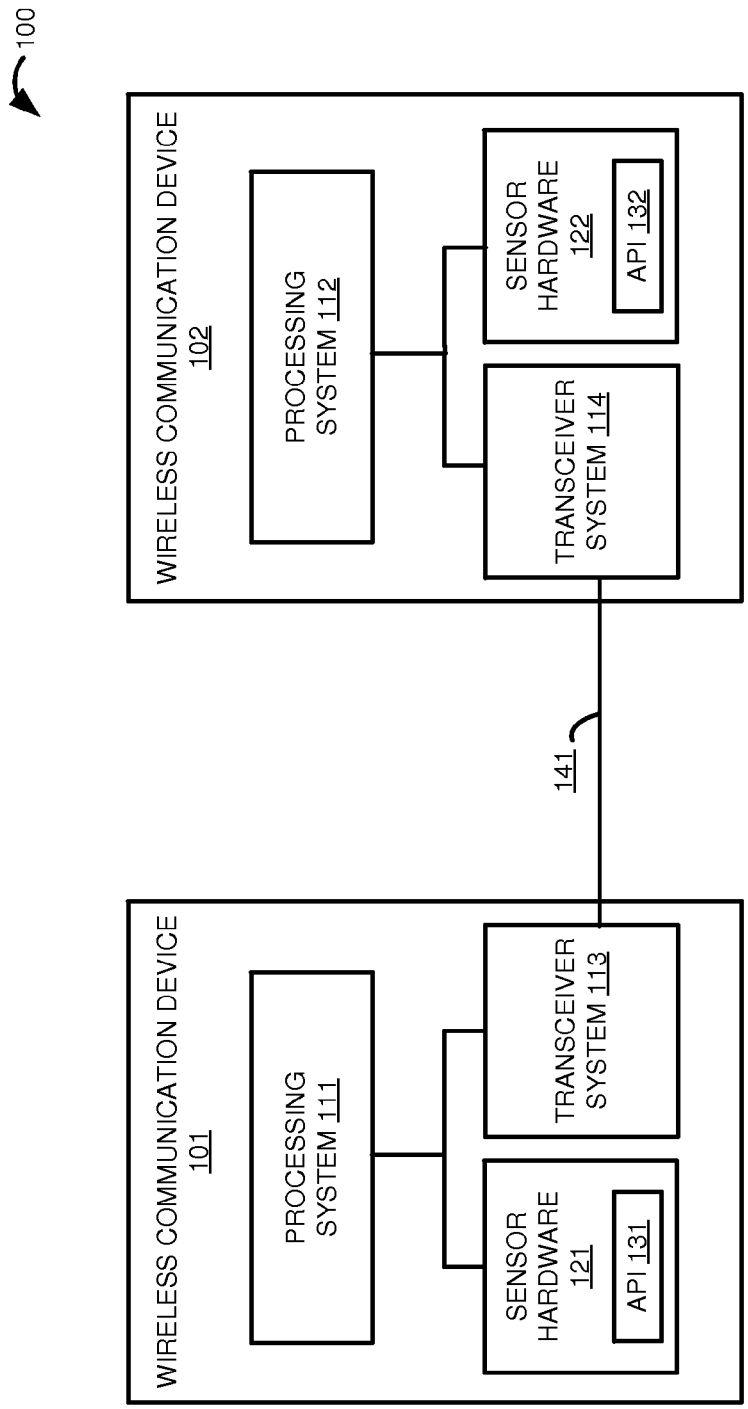
FIG. 1 illustrates a wireless communication system to secure data communications between Application Programming Interfaces (APIs).

FIG. 1 illustrates wireless communication system 100 to secure data communications between Application Programming Interfaces (APIs). Wireless communication system 100 includes wireless communication device 101, wireless communication device 102, and communication link 141.

Wireless communication device 101 includes processing system 111, transceiver system 113, and sensor hardware 121. Sensor hardware 121 includes API 131. Wireless communication device 102 includes processing system 112, transceiver system 114, and sensor hardware 122. Sensor hardware 122 includes API 132. Wireless communication device 101 and wireless communication device 102 communicate over communication link 141. Wireless communication link 141 may comprise one or more communication networks. Wireless communication system 100 and wireless communication devices 101 and 102 may include other components not shown for clarity.

In operation, processing system 111 in wireless communication device 101 identifies an API request transferred from API 131 to externally share sensor data associated with sensor hardware 121. The API share request is for API 132 in wireless communication device 102. Processing system 111 performs a security challenge to verify API 131. In some examples, the security challenge is performed in response to triggers such as, the requesting API, destination API, destination wireless communication device, and/or other triggers—including combinations thereof. If API 131 is verified, transceiver system 113 transfers the API request for delivery to wireless communication device 102. If API 131 is not verified, processing system 111 may perform a partial reboot on sensor hardware 121/API 131. In some examples, processing system 111 may perform a reboot of wireless communication device 101. Although, not required, wireless communication device 101 may re-install a API 131.

Transceiver system 114 in wireless communication device 102 receives the API request for sensor hardware 122/API 132. In some examples, processing system 112 receives the API request directly from wireless communication device 101. Processing system 112 in wireless communication device 102 performs a security challenge to verify API. In some examples, the security challenge is performed in response to triggers such as, the requesting API, destination API, API type, API source, destination wireless communication device, and/or other triggers—including combinations thereof. If API 132 is verified, processing system 112 transfers the API request to API 132. If API 132 is not verified, processing system 112 may perform a partial reboot on sensor hardware 122/API 132. In some examples, processing system 112 may perform a reboot of wireless communication device 102. In some examples, wireless communication device 102 may re-install API 132. Although not required, the API share request may also be transferred to sensor hardware 122. In some examples, the API request may be transferred to another API located on the same wireless communication device.

In some examples, wireless communication devices 101 and 102 are communicating over the same communication network, although, wireless communication devices 101 and 102 may communicate over multiple different communication networks. Examples of wireless communication devices 101 and 102 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Examples of sensor hardware 121 and 122 include camera, speaker, microphone, Global Positioning System (GPS), location, keyboard, screen, touch screen, video card, retina scan, fingerprint scan, and/or other sensor hardware—including combinations thereof. Examples of APIs 131 and 132 include interfaces for the camera, speaker, microphone, GPS, location, keyboard, screen, touch screen, video card, retina scan, fingerprint scan, and/or other interfaces.

Figure 2:
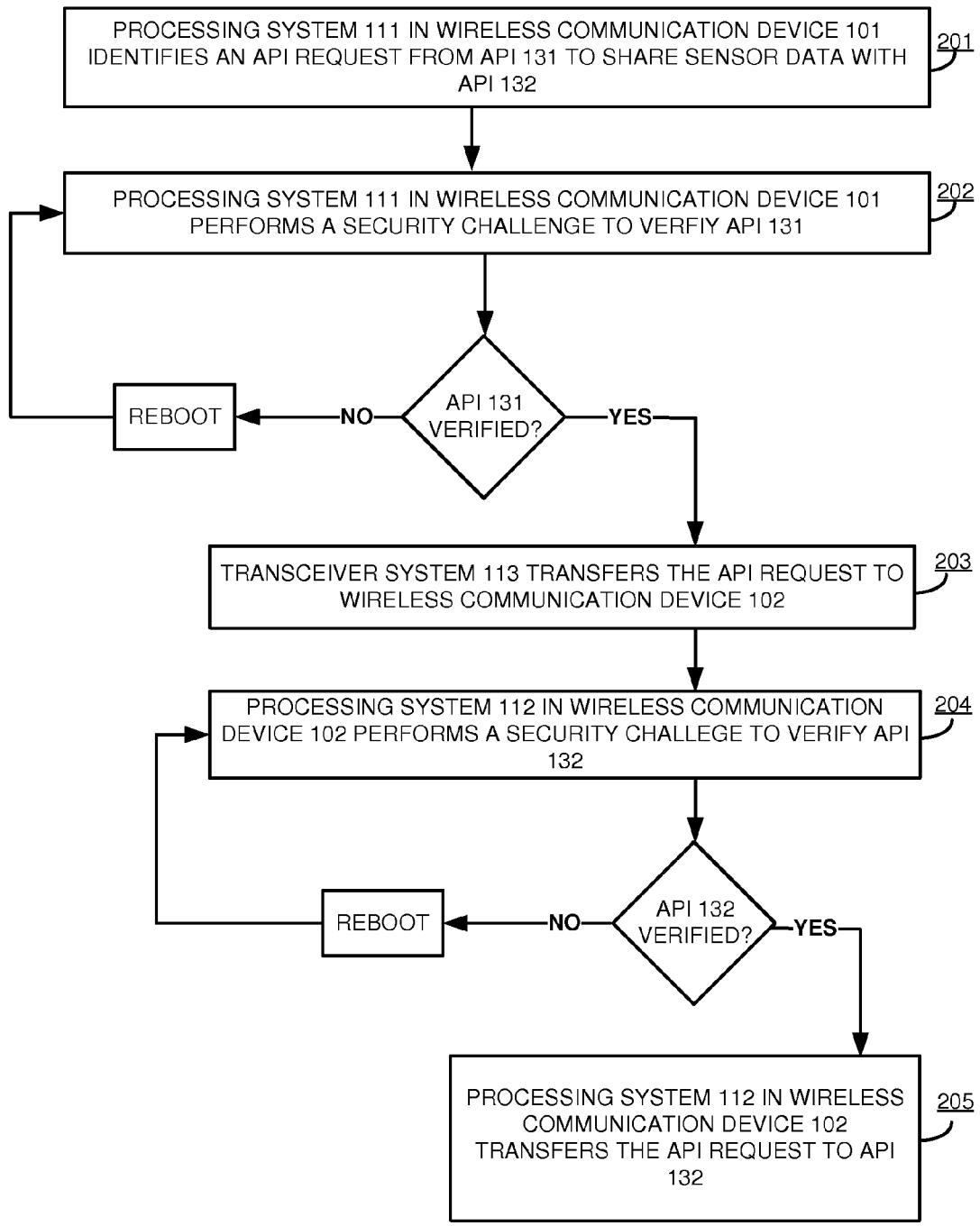
FIG. 2 illustrates the operation of the wireless communication system to secure data communications between APIs.

FIG. 2 illustrates the operation of wireless communication system 100 to secure data communications between APIs. Processing system 111 in wireless communication device 101 identifies an API request from API 131 to share sensor data with API 132 (201). For example, a camera application is running on wireless communication device 101 and the camera API transfers an API share request to share a picture on wireless communication device 101 with wireless communication device 102.

Processing system 111 in wireless communication device 101 performs a security challenge to verify API 131 (202). In some, examples, the security challenge may be using generating a random number generator. A random number is generated and transferred to API 131; API 131 returns a result for verification. Other examples of security challenges include the use of digital signatures, digital certificates, authentication tokens, secret keys, public keys, encryption keys, and/or other types of security encryption—including combinations thereof. Although not required, wireless communication device 101 and 102 may be running a security API, such as Trust Zone™.

If API 131 is verified, transceiver system 113 in wireless communication device 101 transfers the API request to wireless communication device 102 (203). In some examples, API 131 fails the security challenge and is not verified. If API 131 is not verified, wireless communication device 101 may perform a partial reboot on the corresponding sensor hardware 121. In other examples, wireless communication device 101 may perform a full reboot of wireless communication device 101.

Transceiver system 114 in wireless communication device 102 receives the API request transferred from wireless communication device 101. Although not required, processing system 112 may comprise a secure portion and an unsecure portion. In some examples, if processing system 111 and processing system 112 have previously established a secured connection, the API request may be transferred to the secure portion of processing system 112. In other examples, the API request may be transferred to the unsecure portion of processing system 112.

Processing system 112 in wireless communication device 102 performs a security challenge to verify API 132 (204). In some, examples, the security challenge may be using generating a random number generator. A random number is generated and transferred to API 131; API 131 returns a result for verification. Other examples of security challenges include the use of digital signatures, digital certificates, authentication tokens, secret keys, public keys, encryption keys, and/or other types of security encryption—including combinations thereof. Although not required, wireless communication device 101 and 102 may be running a security API, such as Trust Zone™.

If API 132 is verified, processing system 112 transfers the API request to API 132 (205). In some examples, API 132 fails the security challenge and is not verified. If API 132 is not verified, wireless communication device 102 may perform a partial reboot on the corresponding sensor hardware 122. In other examples, wireless communication device 102 may perform a full reboot of wireless communication device 102.

Figure 3:
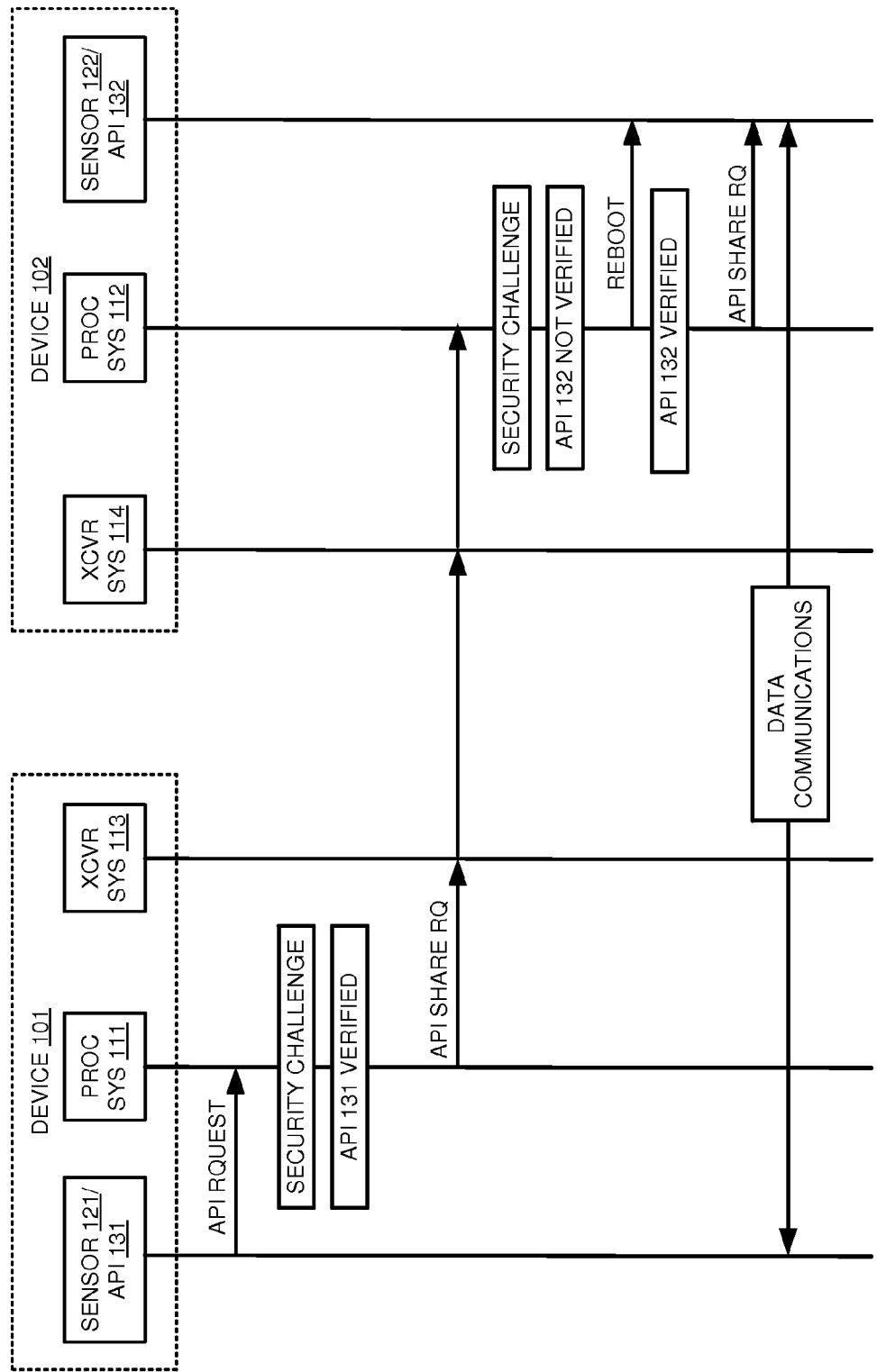
FIG. 3 illustrates the operation of the wireless communication system to secure data communications between APIs.

FIG. 3 illustrates the operation of wireless communication system 100 to secure data communications between APIs. Processing system 111 in wireless communication device 101 identifies an API share request transferred from hardware sensor 121/API 131. Processing system 111 in wireless communication device 101 performs a security challenge to verify hardware sensor 121/API 131. If hardware sensor 121/API 131 is verified, processing system 111 in wireless communication device 101 transfers the API share request for delivery to transceiver system 113. Transceiver system 113 in wireless communication device 101 transfers the API share request to transceiver system 114 in wireless communication device 102. In some examples, processing system 111 and processing system 112 may be in direct communication. In other examples, processing system 111 may bypass transceiver system 113.

Processing system 112 in wireless communication device 102 performs a security challenge to verify API 132. If API 132 is not verified, processing system performs a partial reboot on sensor hardware 122/API 132. After the partial reboot is performed, processing system 112 performs a security challenge to verify API 132. If API 132 is verified, processing system 112 transfers the API share request to sensor hardware 122/API 132 in wireless communication device 102. A secure communication is established between wireless communication device 101 and wireless communication device 102 for transferring sensor data.

Figure 4:
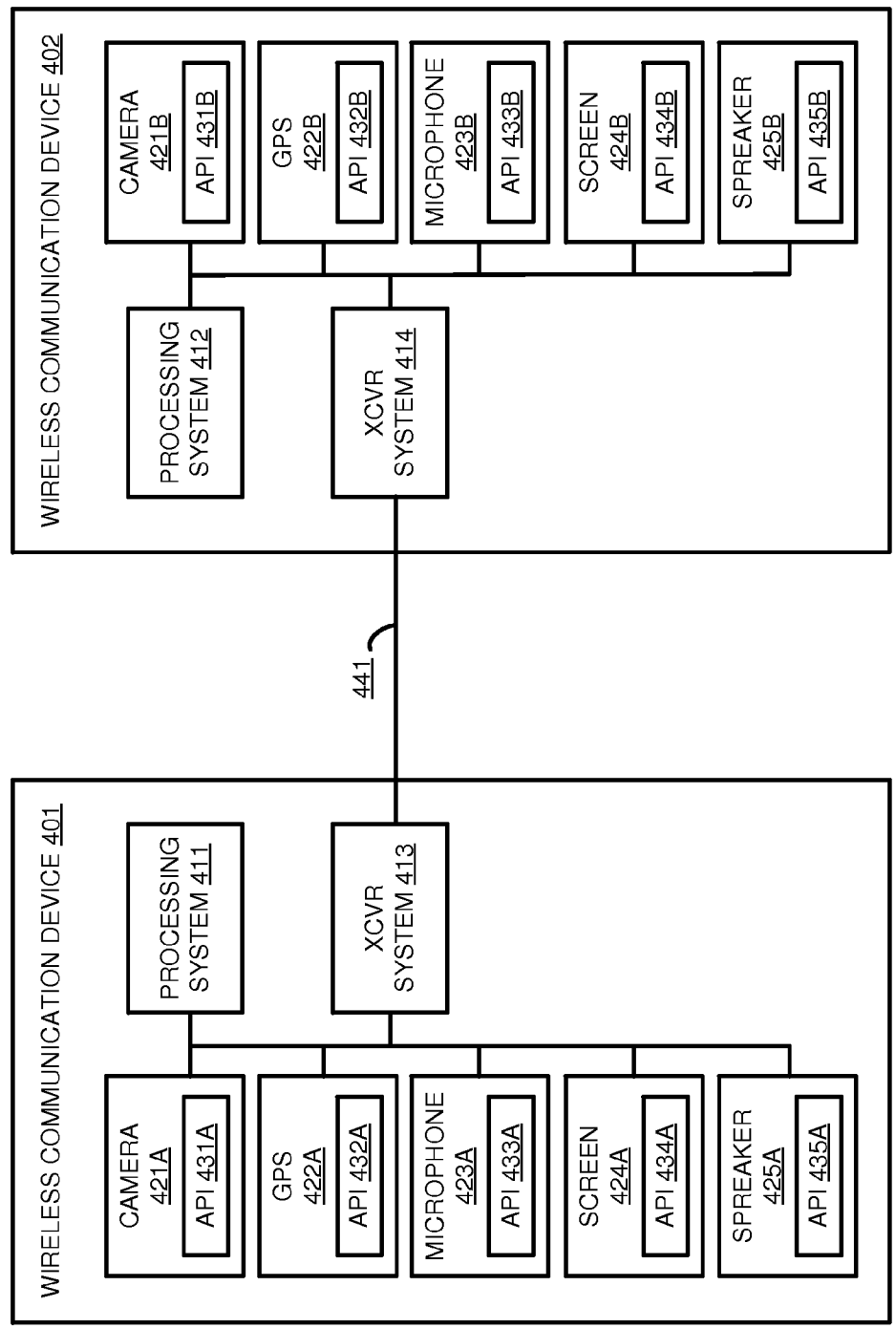
FIG. 4 illustrates a wireless communication system to secure data communications between APIs.

FIG. 4 illustrates wireless communication system 400 to secure data communications between APIs. Wireless communication system 400 includes wireless communication device 401, wireless communication device 402, and communication link 441. Wireless communication device 401 and wireless communication device 402 communicate over communication link 441. Wireless communication link 441 may comprise one or more communication networks. Wireless communication system 400 and wireless communication devices 401 and 402 may include other components not shown for clarity.

Wireless communication device 401 includes processing system 411, transceiver system 413, camera 421A, GPS API 422A, microphone 423A, screen 424A, and speaker 425A. API 431A interfaces with camera 421A. API 432A interfaces with GPS 422A. API 433A interfaces with microphone 423A. API 434A interfaces with screen 424A. API 435A interfaces with speaker 425A. Wireless communication device 401 may include other hardware and/or APIs not shown for clarity.

Wireless communication device 402 includes processing system 412, transceiver system 414, camera 421B, GPS API 422B, microphone 423B, screen 424B, and speaker 425B. API 431B interfaces with camera 421B. API 432B interfaces with GPS 422B. API 433B interfaces with microphone 423B. API 434B interfaces with screen 424B. API 435B interfaces with speaker 425B. Wireless communication device 402 may include other c hardware and/or APIs not shown for clarity.

In operation, processing system 411 in wireless communication device 401 identifies an API request transferred from GPS 422A/GPS API 432A to share location data of wireless communication device 401. Processing system 411 in wireless communication device 401 performs a security challenge to verify GPS 422A/GPS API 432A. If GPS 422A/GPS API 432A is verified, processing system 411 in wireless communication device 401 transfers the location API share request for delivery to transceiver system 413. Transceiver system 413 transfers the location API share request for delivery to wireless communication device 402. Processing system 412 in wireless communication device 402 performs a security challenge to verify GPS 422B/GPS API 432B. If GPS 422B/GPS API 432B is verified, processing system 412 transfers the API share request to GPS 422B/GPS API 432B in wireless communication device 402. A secure communication is established to share location data between wireless communication device 401 and wireless communication device 402.

In another example, processing system 411 in wireless communication device 401 identifies an API request transferred from microphone 423A/microphone API 433A to share audio data of wireless communication device 401. Processing system 411 in wireless communication device 401 performs a security challenge to verify microphone 423A/microphone API 433A. If microphone 423A/microphone API 433A is verified, processing system 411 in wireless communication device 401 transfers the API audio data share request for delivery to transceiver system 413. Transceiver system 413 transfers the API audio data share request for delivery to wireless communication device 402. Processing system 412 in wireless communication device 402 performs a security challenge to verify microphone 423B/microphone API 433B. If microphone 423B/microphone API 433B is verified, processing system 412 transfers the API audio data share request to microphone 423B/microphone API 433B in wireless communication device 402.

In some examples, wireless communication devices 401 and 402 are communicating over the same communication network. Although not required, wireless communication devices 401 and 402 may communicate over multiple communication networks. For example, wireless communication device 401 may communicate over an LTE network and wireless communication device 402 may communicate over a CDMA network. In other examples, wireless communication device 401 may communicate over a WIFI network and wireless communication device 402 communicates over an LTE network.

Figure 5:
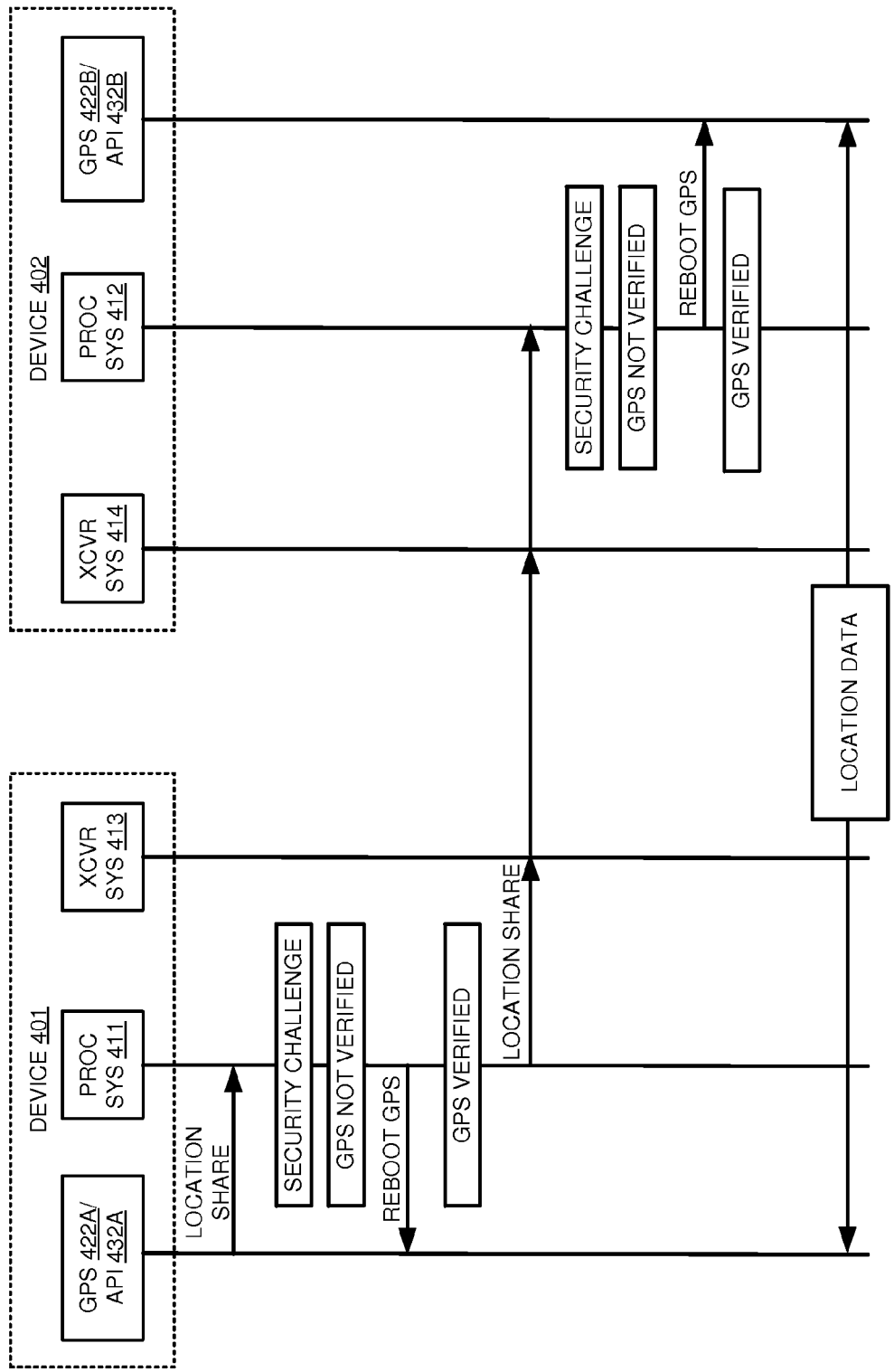
FIG. 5 illustrates the operation of the wireless communication system to secure data communications between APIs.

FIG. 5 illustrates the operation of wireless communication system 400 to secure data communications between APIs. Processing system 411 in wireless communication device 401 identifies an API share request transferred from GPS 422A/GPS API 432A. Processing system 411 in wireless communication device 401 performs a security challenge to verify GPS 422A/GPS API 432A. If GPS 422A/GPS API 432A is not verified, processing system 411 in wireless communication device 401 performs a partial reboot on GPS 422A/GPS API 432A. Processing system 411 in wireless communication device 401 performs a security challenge to verify GPS 422A/GPS API 432A. If GPS 422A/GPS API 432A is verified, wireless communication device 401 transfers the API share request to wireless communication device 402.

Processing system 412 in wireless communication device 402 identifies an API share request transferred from wireless communication device 401. Processing system 412 in wireless communication device 402 performs a security challenge to verify GPS 422B/GPS API 432B. If GPS 422B/GPS API 432B is not verified, processing system 412 in wireless communication device 402 performs a partial reboot on GPS 422B/GPS API 432B. Processing system 412 in wireless communication device 402 performs a security challenge to verify GPS 422B/GPS API 432B. If GPS 422B/GPS API 432B is verified, processing system 412 in wireless communication device 402 transfers the API share request to GPS 422B/GPS API 432B. A secure connection is established between GPS 422A/GPS API 432A and GPS 422B/GPS API 432B. For example, wireless communication device 401 may share its location data with wireless communication device 402. Wireless communication device 401 may subsequently change its location, if the secure connection is still available, wireless communication device 401 may update wireless communication device 402 with its updated location without the need to re-verify the APIs.

In another example, processing system 411 in wireless communication device 401 identifies an API share request transferred from screen 424A/screen API 434A. Processing system 411 in wireless communication device 401 performs a security challenge to verify screen 424A/screen API 434A. If screen 424A/screen API 434A is not verified, processing system 411 in wireless communication device 401 performs a partial reboot on screen 424A/screen API 434A. Processing system 411 in wireless communication device 401 performs a security challenge to verify screen 424A/screen API 434A. If screen 424A/screen API 434A is verified, wireless communication device 401 transfers the API share request to wireless communication device 402.

Processing system 412 in wireless communication device 402 identifies an API share request for screen 424B/screen API 434B transferred from wireless communication device 401. Processing system 412 in wireless communication device 402 performs a security challenge to verify screen 424B/screen API 434B. If screen 424B/screen API 434B is not verified, processing system 412 in wireless communication device 402 performs a partial reboot on screen 424B/screen API 434B. Processing system 412 in wireless communication device 402 performs a security challenge to verify screen 424B/screen API 434B. If screen 424B/screen API 434B is verified, processing system 412 in wireless communication device 402 transfers the API share request to screen 424B/screen API 434B. A secure connection is established between screen 424A/screen API 434A and screen 424B/screen API 434B.

Figure 6:
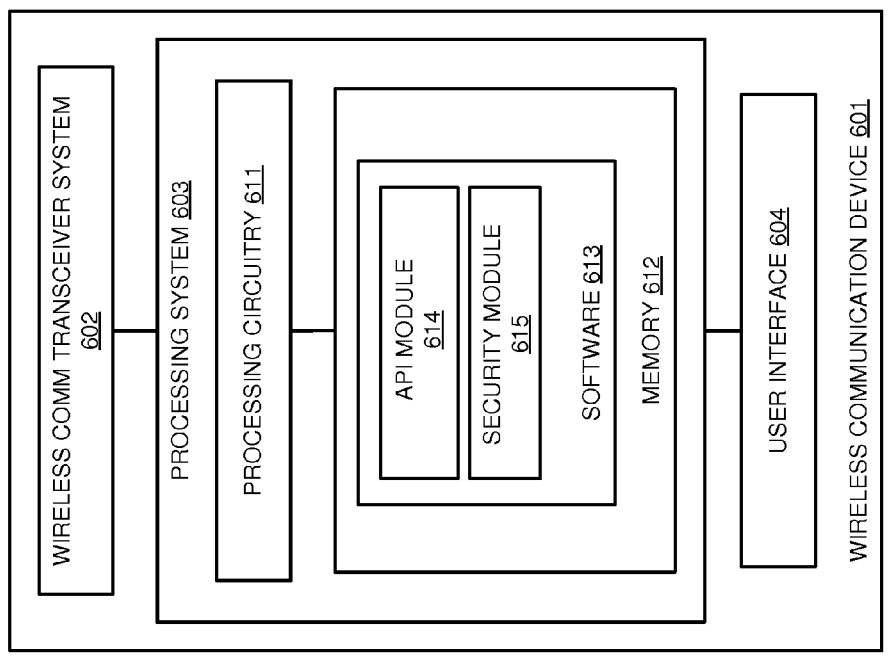
FIG. 6 illustrates an example of a wireless communication device.

FIG. 6 illustrates an example of wireless communication device 601 to secure data communications between APIs. Wireless communication device 601 is an example of wireless communication devices 101-102 and 401-402, although wireless communication devices 101-102 and 401-402 may use alternate configurations. Wireless communication device 601 comprises wireless communication transceiver system 602, processing system 603, and user interface 604. Processing system 603 is linked to wireless communication transceiver system 602 and user interface 604. Processing system 603 includes processing circuitry 611 and memory 612 that stores operating software 613. Software 613 comprises API module 614 and security module 615.

Wireless communication device 601 may include other well-known components such as a battery and enclosure that are not shown for clarity. Wireless communication device 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as CDMA, EVDO, WIMAX, GSM, LTE, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus. Processing circuitry 611 is typically mounted on a circuit board that may also hold memory 612, portions of wireless communication transceiver system 602, and user interface 604. Operating software 613 comprises computer programs, firmware, or some other form of machine-readable processing instructions. Operating software 613 may include an operating system, utilities, drivers, network interfaces, applications, or some other type of software.

When executed, software 613 directs processing system 603 to operate as described herein to secure communications between APIs. In particular, API module 614 directs processing system 603 to transfer the API share request. Security module 615 directs processing system 603 to perform a security challenge to verify the API.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Communication link 141 comprises network elements that provide communications services to wireless communication devices 101 and 102.

Communication link 141 may comprise switches, wireless access nodes, Internet routers, network gateways, application servers, computer systems, communication links, or some other type of communication equipment—including combinations thereof.

Communication link 141 uses metal, glass, the air or space, or other material as transport media. Communication link 141 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 141 may also use various communication protocols, such as Time Division Multiplex (TDM), Internet Protocol (IP), Ethernet, communication signaling, or some other communication format—including combinations thereof. Communication link 141 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to secure data communications between a first Application Programming Interface (API) for a first sensor in a first wireless communication device and a second API for a second sensor in a second wireless communication device, the method comprising:
   in the first wireless communication device, identifying an API request to externally share sensor data transferred from the first API for the first sensor in the first wireless communication device;
   in the first wireless communication device, in response to identifying the API request from the first sensor in the first wireless communication device, performing a first security challenge to verify the first API for the first sensor in the first wireless communication device;
   in response to verifying the first API for the first sensor in the first wireless communication device, transferring the API request for delivery to the second wireless communication device;
   in the second wireless communication device, performing a second security challenge to verify the second API for the second sensor in the second wireless communication device; and
   in the second wireless communication device, in response to verifying the second API for the second sensor in the second wireless communication device, transferring the API request for delivery to the second API for the second sensor in the second wireless communication device.

2. The method of claim 1 further comprising, in the first wireless communication device, in response to the first API failing the first security challenge, rebooting the first sensor.

3. The method of claim 1 further comprising, in the second wireless communication device, in response to the second API failing the second security challenge, rebooting the second sensor.

4. The method of claim 1 further comprising, in the first wireless communication device, in response to the first API failing the first security challenge, rebooting the first wireless communication device.

5. The method of claim 1 further comprising, in the second wireless communication device, in response to the second API failing the second security challenge, rebooting the second wireless communication device.

6. The method of claim 1 wherein the first sensor comprises a Global Positioning System (GPS) and the sensor data comprises location data.

7. The method of claim 1 wherein the first sensor comprises a camera and the sensor data comprises a picture or a video.

8. The method of claim 1 wherein the first sensor comprises a keyboard and the API data comprises keystroke data.

9. The method of claim 1 wherein the first sensor comprises a microphone and the API data comprises audio data.

10. The method of claim 1 wherein the first sensor comprises a touch screen and the API data comprises user inputs.

11. A wireless communication system to secure data communications between a first Application Programming Interface (API) for a first sensor in a first wireless communication device and a second API for a second sensor in a second wireless communication device, the wireless communication system comprising:
   the first wireless communication device configured to identify an API request to externally share sensor data;
   the first wireless communication device configured to perform a first security challenge to verify the first API for the first sensor in the first wireless communication device;
   in response to verifying the first API for the first sensor in the first wireless communication device, the first wireless communication device configured to transfer the API request to the second wireless communication device;
   the second wireless communication device configured to perform a second security challenge to verify the second API for the second sensor in the second wireless communication device; and
   in response to verifying the second API for the second sensor in the second wireless communication device, the second wireless communication device configured to transfer the API request to the second API in the second wireless communication device.

12. The wireless communication system of claim 11 further comprising,
   in response to the first API failing the first security challenge, the first wireless communication device configured to reboot the first sensor.

13. The wireless communication system of claim 11 further comprising,
   in response to the second API failing the second security challenge, the second wireless communication device configured to reboot the second sensor.

14. The wireless communication system of claim 11 further comprising,
   in response to the first API failing the first security challenge, the first wireless communication device configured to reboot the first wireless communication device.

15. The wireless communication system of claim 11 further comprising,
   in response to the second API failing the second security challenge, the second wireless communication device configured to reboot the second wireless communication device.

16. The wireless communication system of claim 11 wherein the first sensor comprises a Global Positioning System (GPS) and the sensor data comprises location data.

17. The wireless communication system of claim 11 wherein the first sensor comprises a camera and the sensor data comprises a picture or a video.

18. The wireless communication system of claim 11 wherein the first sensor comprises a keyboard and the API data comprises keystroke data.

19. The wireless communication system of claim 11 wherein the first sensor comprises a microphone and the API data comprises audio data.

20. The wireless communication system of claim 11 wherein the first sensor comprises a touch screen and the API data comprises user inputs.

* * * * *